United States Patent [19]
Billet et al.

[11] 3,917,687

[45] Nov. 4, 1975

[54] PREPARATION OF DICARBOXYLIC ACIDS

[75] Inventors: Lucien Billet; Guy Lartigau, both of Lyon, France

[73] Assignee: Rhone-Poulenc S.A., Paris, France

[22] Filed: Sept. 17, 1973

[21] Appl. No.: 397,977

[30]      Foreign Application Priority Data
   Sept. 18, 1972   France .............................. 72.32963

[52] U.S. Cl. ...... 260/537 P; 260/526 R; 260/610 R
[51] Int. Cl.$^2$.......................................... C07C 51/00
[58] Field of Search.................................. 260/537 P

[56]          References Cited
         UNITED STATES PATENTS
2,601,223   6/1952   Roedel ........................... 260/537 P 2,601,224   6/1952   Roedel ........................... 260/537 P FOREIGN PATENTS OR APPLICATIONS
1,066,259   6/1954   France............................ 260/537 P

*Primary Examiner*—Vivian Garner
*Attorney, Agent, or Firm*—Cushman, Darby & Cushman

[57]            ABSTRACT

Alkane dicarboxylic acids containing at least 8 carbon atoms in the linear chain are obtained by deperoxidising a peroxide, obtainable by hydrogen peroxide oxidation of a cycloalkane containing 5-8 ring carbon atoms, with a ferrous carboxylate in the presence of an alkane carboxylic acid.

17 Claims, No Drawings

PREPARATION OF DICARBOXYLIC ACIDS

The present invention relates to a process for the preparation of long chain alkane-dicarboxylic acids. More particularly, it relates to the preparation of dicarboxylic acids containing at least 8 carbon atoms in the chain which separates the two hydroxycarbonyl groups.

Long chain dicarboxylic acids, such as 1,10-decanedioic acid, 1,12-dodecanedioic acid and 4,9-dimethyl-1,12-dodecanedioic acid, are important industrial products which are used especially for the preparation of polycondensates of the linear polyester and polyamide type, intended for the manufacture of fibres.

Numerous processes for the production of long chain dicarboxylic acids have been proposed; amongst the most valuable, two groups can be distinguished which depend on the nature of the starting product. According to the first group of processes, the long chain acid is obtained from a compound which has the same number of carbon atoms as the desired product. Thus decanedioic acid can be produced by oxidation of cyclodecane by means of the usual oxidising agents and dodecanedioic acid can be produced by oxidation of cyclic hydrocarbons such as cyclododecane and cyclododecene. According to the second group of processes, the aliphatic dicarboxylic acid is obtained from cycloalkanones containing half as many carbon atoms as the desired acid. This process consists, in a first stage, of preparing the peroxides of the cycloalkanone (cyclopentanone, cyclohexanone, methylcyclohexanone and cyloheptanone) by oxidising the latter by means of hydrogen peroxide in an organic solvent (ethers of alcohols): compare U.S. Pat. No. 2,298,405; N. A. MILAS et al., J. Am Chem. Soc. 61, 2430-32 (1939); or in the absence of an organic solvent: E. G. E. HAWKINS, J. Chem. Soc., 1955, 3463–67 and M. KARASH et al., J. Org. Chem., 23, 1322–26 (1958). In a second stage, the peroxides thus obtained are subjected to a double reduction under the action of a reducing compound such as the ions of metals of variable valency especially ferrous ions; compare U.S. Pat. No. 2,601,223. This reaction is preferably carried out in an organic solvent (alcohols; benzene; esters; or ethers). Methanol is the solvent which is most suitable for this type of reaction because it is the best solvent for ferrous sulphate, which is considered to be the most effective deperoxidation agent. The yields of dicarboxylic acid relative to the cycloalkanone can vary depending on the conditions of oxidation of the latter (conditions which determine the nature of the peroxides obtained) and on the double deperoxidation of the peroxides. In addition to the long chain dicarboxylic acid, by-products are formed such as the starting cycloalkanone and carboxylic and hydroxy-carboxylic acids (or their polyesters) with the same number of carbon atoms as the starting ketone; thus, in addition to dodecanedioic acid, cyclohexanone, caproic acid and 6-hydroxy-hexanoic acid are formed.

Although the second type of process starting from cycloalkanones is of great industrial value because of the relatively low cost of the starting materials and because of the fact that cycloalkanones are common products, numerous disadvantages are associated with the use of the methanol/ferrous sulphate combination which is the best known double deperoxidation system. For example, it has been found that when the reaction is carried out in an alcohol, especially methanol, ketalization of the cycloalkanone and partial esterification of the resulting dicarboxylic acids takes place. Thus it is necessary to saponify the ketals and the esters in order to recover the cycloalkanone and the required diacid. It has been found moreover that, during the reaction, the ferrous sulphate heptahydrate is converted into ferrous sulphate dihydrate which is less soluble in alcohols and rather inactive and that a part of the iron precipitates in the form of the dicarboxylic acid salt. Furthermore, the low solubility of $FeSO_4 \cdot 7H_2O$ in methanol necessitates the use of very large amounts of methanol and this restricts the productivity of the equipment. Moreover, dicarboxylic acids are relatively soluble in methanol (the solubility of dodecanedioic acid in methanol is 8% by weight) and consequently it is necessary to recycle a large amount of the solution of the diacid in methanol. Thus, for all these reasons, it is important to replace the $FeSO_4$/methanol combination by a solvent and an iron derivative chosen in such a way as to provide good solubility of the iron derivative in the solvent for the entire duration of the reaction and to avoid the formation of a ferrous dicarboxylate. Moreover, it is important to employ a solvent in which the solubility of the dicarboxylic acid is as low as possible.

Accordingly, the present invention provides a process for the preparation of an alkane-dicarboxylic acid containing at least 8 carbon atoms in the linear divalent chain separating the hydroxycarbonyl groups, which comprises deperoxidising a peroxide obtainable by reacting hydrogen peroxide with a cycloalkanone of the general formula:

   I in which R represents a linear or branched divalent saturated hydrocarbon radical containing 4 to 7 carbon atoms in the linear part of R wherein the deperoxidisation is carried out with a ferrous carboxylate in the presence of a first alkane-carboxylic acid containing at least two carbon atoms used as solvent.

Examples of cycloalkanones of the formula I, the peroxides of which can be used in the process of the invention, are cyclopentanone, cyclohexanone, 3-methylcyclohexanone, 2-methyl-cyclohexanone, 4-methylcyclohexanone, cycloheptanone and cyclooctanone.

A preferred embodiment of the process of the present invention comprises double deperoxidizing a peroxide of the general formula:

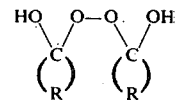   II in which R is as hereinbefore defined, either alone or together with other peroxides of the general formula:

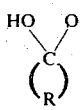 and/or 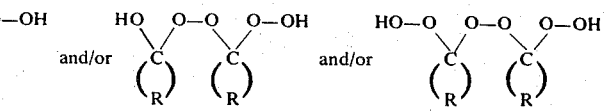

III IV V obtained by oxidation of cycloalkanones of the formula I by means of hydrogen peroxide.

In the formulae I and II the divalent radical R can be substituted by 1 or 2 alkyl groups, which may be the same or different, of 1 to 4 carbon atoms, preferably methyl or ethyl radicals.

Depending on the conditions of the reaction, and especially depending on the acidity of the medium, various peroxides corresponding to the general formulae II and:

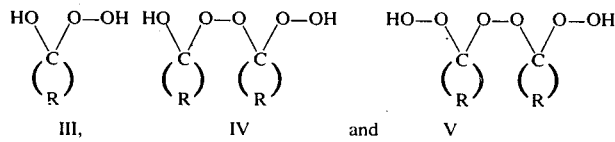

III, IV and V are formed during the oxidation of cycloalkanones with hydrogen peroxide.

However, according to M. S. KARASH et al., loc. cit. and V. L. ANTONOVSKI, J. Appl. Chem., USSR, 40, 2443 (1967), a peroxide of the formula II only is obtained when the oxidation is carried out in a neutral medium and peroxides of formulae IV and V only are obtained when the reaction is carried out in the presence of inorganic acids. Finally, although the peroxide of the formula III has not been isolated, it has been described as the intermediate in the formation of the peroxide of the formula II during the oxidation of cycloalkanones by hydrogen peroxide and would most probably be in equilibrium with it in crude cycloalkanone oxidation solutions [compare V. L. ANTONOVSKI et al., Russian J. of Phys. Chem. 39, 1549–52 (1965)]. Consequently, although the peroxide of the formula II is to be considered as the preferred starting compound for carrying out the process of the present invention, and although it can be isolated easily in the pure state from mixtures of the oxidation of cycloalkanones by hydrogen peroxide, it is also possible to use either its solid mixtures with, especially, peroxides of the formula IV and V, or crude oxidation solutions containing II and III and/or IV and/or V.

Examples of peroxides of the formula II are 1,1'-dihydroxy-cyclopentyl peroxide; 1,1'-dihydroxy-cyclohexyl peroxide; 1,1'-dihydroxy-2,2'-dimethyl-cyclohexyl peroxide; 1,1'-dihydroxy-3,3'-dimethyl-cyclohexyl peroxide; 1,1'-dihydroxy-4,4'-dimethyl-cyclohexyl peroxide; 1,1'-dihydroxy-cycloheptyl peroxide; and 1,1'-dihydroxy-cyclooctyl peroxide.

The process of the present invention is particularly suitable for the production of dodecanedioic acid from 1,1'-dihydroxy-cyclohexyl peroxide, either alone or together with 1-hydroperoxy-cyclohexanol and/or 1-hydroxy-1'-hydroperoxy-cyclohexyl peroxide and/or 1,1'-dihydroperoxy-cyclohexyl peroxide.

The alkane-carboxylic acids used as solvents according to the invention contain at least 2 carbon atoms and can contain up to 12 carbon atoms, preferably up to 8 carbon atoms, and comprise especially acetic, propionic, butyric, pentanoic, caproic, heptanoic and octanoic acids. An acid is preferably used which has a higher boiling point than the starting cycloalkanone which is formed as a by-product during the reaction. This makes it possible to recover the cycloalkanone easily by distillation and to recycle it to the preparation zone of the starting peroxide. As a further preference, amongst these acids, that corresponding to the alkane-carboxylic acid formed during the deperoxidation is used. Thus, during the preparation of dodecanedioic acid, caproic acid is preferably used as the solvent.

The carboxylic acid solvent can be used in the anhydrous state or can contain a small amount of water, for example up to 10% by weight.

Although in general terms it is possible to use any ferrous carboxylate whatsoever as the reducing agent, such as ferrous acetate, propionate, butyrate, pentanoate, caproate, heptanonate, resinate, naphthenate and benzenecarboxylate, it is preferred, for reasons of convenience, to employ the ferrous salt of the acid used as the solvent. For example, it is convenient to use ferrous caproate during the double deperoxidation of 1,1'-dihydroxy-cyclohexyl peroxide in caproic acid.

As has been stated previously, the cycloalkanone peroxides, and especially those of the formula II, can be employed either after they have been isolated from the reaction mixture resulting from the oxidation of the cycloalkanones according to the usual methods or they can be employed in the form of the crude reaction mixture produced during this oxidation. Although in the latter case there is nothing against the use of reaction mixtures resulting from the oxidation of cycloalkanones in organic solvents such as alcohols (e.g., methanol, ethanol, and t-butanol), ethers (e.g., diethyl ether, dioxane and tetrahydrofurane), esters of saturated aliphatic acids (e.g., ethyl acetate) and aromatic hydrocarbons (e.g., benzene and toluene), those advantages gained by the use of carboxylic acids as solvents for the deperoxidation are then lost. Thus it has been found that it is particularly advantageous, and this forms a further subject of the present invention, during this stage to use the crude solutions for the oxidation of the cycloalkanone by hydrogen peroxide in the alkane-carboxylic acid used as the solvent for the deperoxidation. In order to carry out this last stage, all that has to be done is to add the suitable amount of the appropriately chosen ferrous carboxylate dissolved in the corresponding alkane-carboxylic acid. By working in this way, the process is considerably simplified.

The production of the crude solutions for the oxidation of cycloalkanones by hydrogen peroxide, is carried out under the general conditions employed for this reaction and described in the prior art already mentioned. More precisely, the temperature at which the peroxidation is carried out can vary between 0° and 80°C and the molar ratio of hydrogen peroxide to the cycloalkanone is between 0.1 and 1, and preferably approximately 0.5.

The deperoxidation is carried out under the usual conditions indicated by the prior art, and especially by U.S. Pat. No. 2,601,223. Thus, the temperature of the reaction can vary from −100° to +100°C and the pressure can be greater than, less than or equal to atmospheric pressure. The amount of ferrous carboxylate, expressed as the ratio of the number of ferrous ions to the number of active oxygen atoms, can vary within rather wide limits. It is, however, preferable for this ratio to be close to the stoichiometric requirements, that is to say approximately 1. It is possible, without disadvantage, to use an excess of ferrous ions so as to bring this ratio to 2 or more, but there is no particular advantage to be gained from this.

The concentration of the cycloalkanones or the peroxides in the alkane-carboxylic acid solvent is not critical and it is possible to work with amounts of carboxylic acid which ensure the complete solubility of the products of the reaction. However, in order to limit the volume of the reaction mixture and to avoid having to carry out too large distillations, it is preferable to arrange that the amount of solvent used is such that the greater part of the dicarboxylic acid produced is caused to precipitate as it is formed.

From a practical point of view, the peroxide solution (whether it is a crude peroxidation solution or a solution obtained by dissolving solid 1,1'-dihydroxy-cycloalkyl peroxide, alone or together with other peroxides, in the solvent), is introduced into the solution of ferrous carboxylate in the chosen solvent. It is generally preferable for one and/or the other of these solutions to be saturated with the dicarboxylic acid which is being synthesised so as to ensure precipitation of that formed during the deperoxidation. For this purpose, it is particularly advantageous to use, as the carboxylic acid solution of ferrous carboxylate, that resulting from a prior operation after the products of the reaction have been isolated and the ferrous iron has been regenerated from the ferric iron by methods known per se. Instead of introducing the peroxide solution into the carboxylate solution, it is also possible to carry out the reverse operation without going beyond the scope of the present invention.

At the end of the deperoxidation, the reaction mixture is treated in the following way: when some dicarboxylic acid has precipitated during the operation, it is filtered off, washed and recrystallized where necessary; the filtrate is then distilled in order to remove the regenerated cycloalkanone which is recycled to the peroxidation zone, optionally together with a part of the solvent which can be re-used thereafter; when the dicarboxylic acid is completely dissolved in the solvent, the cycloalkanone and a definite proportion of the solvent are removed first so as to produce a supersaturated solution of dicarboxylic acid which is precipitated by cooling and filtered off. In every case, after the ferric ions have been reduced to ferrous ions by the usual methods, the solution of ferrous carboxylate in the carboxylic acid saturated with the diacid formed can be re-used for a new deperoxidation operation. These various operations are particularly suitable for carrying out the process continuously.

The following examples illustrate the invention and show how it can be put into practice. In the remainder of the text, the expression "cycloalkanone consumed" denotes the difference between the weight of cycloalkanone employed for the preparation of the peroxide compound and the amount of cycloalkanone measured after the deperoxidation stage.

EXAMPLE 1

A. Preparation of ferrous caproate.

600 cm³ of a 2 N aqueous solution of sodium hydroxide followed by 500 g of caproic acid are introduced, whilst purging with nitrogen and whilst keeping the temperature at 20°C, into a 2 l glass flask equipped with a stirring system and a dip tube for introducing gas. The mixture is stirred for 15 minutes and then 167 g of $FeSO_4.7H_2O$ powder are added. After stirring for 30 minutes, the reaction mixture is left to separate out and the aqueous phase is separated. The remaining organic phase, saturated with water, is distilled in vacuo in order to remove the water to give a solution of ferrous caproate in caproic acid containing 0.77 gram atom of iron per kg of solution.

B. Preparation of 1,1'-dihydroxy-cyclohexyl peroxide.

41.21 g of caproic acid and 21.61 g of cyclohexanone are introduced into a 100 cm³ flask equipped with a stirring system and a dropping funnel and cooled on a water bath of cold water. 5.35 g of a 69% strength by weight aqueous solution of hydrogen peroxide are then gradually run in over the course of 5 minutes. The contents of the flask are stirred for 5 minutes at 20°C.

A sample of the reaction mixture is subjected to an iodometric determination using a solution of acetic acid buffered with potassium iodide. The excess iodine is then titrated using an aqueous solution of sodium hyposulphite. Under these conditions, 68 g of a caproic acid solution containing 0.108 atom of peroxide oxygen consisting mainly of 1,1'-dihydroxy-cyclohexyl peroxide in equilibrium with 1-hydroperoxy-cyclohexanol are obtained (at 20°C, this solution contains 93.1 mol% of 1,1'-dihydroxy-cyclohexyl peroxide and 5.8% of 1-hydroperoxy-cyclohexanol).

C. Preparation of dodecanedioic acid

A solution containing 183.6 g of caproic acid, 40.6 g of ferrous caproate and 7.7 g of dodecanedioic acid is introduced, whilst flushing with an inert gas, into a 500 cm³ flask cooled on an ice bath and equipped with a stirring system and a nitrogen inlet. Then, 60.07 g of the peroxide solution obtained under B are added over the course of 20 minutes whilst keeping the temperature at 5°C. These conditions are maintained for 30 minutes and then the water and the cyclohexanone formed during the reaction, as well as a portion of the caproic acid, are distilled. In this distillate, 10.5 g of cyclohexanone are measured by gas-liquid chromatography.

On a sample of the distillation residue (220.9 g), dodecanedioic acid is measured by gas-liquid chromatography in the form of its methyl diester. It is found that the distillation residue contains 14.5 g of dodecanedioic acid, which corresponds to the production of 6.8 g of this acid during the deperoxidation. The yield is 68% relative to the cyclohexanone converted and 61.5% relative to the hydrogen peroxide employed.

210 g of caproic acid solution are cooled to 5°C. and the dodecanedioic acid which has precipitated is filtered off. The product is washed on the filter with hexane and then dried in vacuo to constant weight. In this way, 7.66 g of a product containing 78% of dodecanedioic acid are obtained, which corresponds to 92% of the acid formed during the reaction.

EXAMPLE 2

Following the same procedure as in Example 1 B, a peroxide solution is prepared from 3 g of hydrogen peroxide, 11.8 g of cyclohexanone and 30 g of caproic acid. 69.3 g of the solution of ferrous caproate in caproic acid of concentration 0.77 g atom/kg are introduced into the apparatus described in Example 1 under C, and, whilst keeping the contents of the flask at between 5° and 10°C, 29.5 g of the peroxide solution are run in over the course of 30 minutes. The reaction mixture is stirred at 5°C for a further 30 minutes and is then treated as in Example 1.

The balance of the reaction, established by determining the products formed, is as follows:
cyclohexanone: 4.3 g,
dodecanedioic acid: 2.73 g (yields: 67.5% relative to the cyclohexanone converted and 60% relative to the hydrogen peroxide employed) and
-n-butyl-octanedioic acid: 0.105 g.

EXAMPLE 3

Following the procedure of Example 1 A, a solution of ferrous octanoate in octanoic acid containing 0.7 g atom of iron per kg is prepared. A peroxide solution, starting from 9.85 g of cyclohexanone, 2.504 g of an aqueous solution containing 69% by weight of $H_2O_2$ and 25 g of octanoic acid, is then prepared according to the method described in Example 1 B. Finally, the peroxide solution is run into 93.4 g of the solution of ferrous octanoate in octanoic acid over the course of 15 minutes and the mixture is then kept at 30°C for 30 minutes. After analyzing the reaction mixture, the following results are obtained:
cyclohexanone formed: 6 g,
dodecanedioic acid formed: 3.07 g (yield: 67.5% relative to the cyclohexanone consumed),
caproic acid formed: 1.08 g and
2-n-butyl-octanedioic acid: 0.105 g.

EXAMPLE 4

Following the procedure of Example 1 A, a solution of ferrous pentanoate in pentanoic acid containing 0.7 g atom of iron per kg of solution is prepared and then, following the method of Example 1 B, a peroxide solution is prepared from 7.84 g of cyclohexanone, 1.971 g of 69% strength by weight hydrogen peroxide and 20 g of pentanoic acid (after the running in of the hydrogen peroxide is finished, the reaction mixture is kept at 20°C for 4 hours).

The deperoxidation is carried out as in Example 1 C, by running, over the course of 17 minutes, 18.6 g of the peroxide solution into 44 g of the solution of ferrous pentanoate kept at −15°C. The reaction mixture is kept at −15°C for 30 minutes and then the usual determinations are carried out. The following results were obtained:
cyclohexanone formed: 2.82 g
dodecanedioic acid: 1.71 g (corresponding to a yield of 70% relative to the cyclohexanone converted),
caproic acid produced: 0.62 g and
2-n-butyl-octanedioic acid in trace amounts.

EXAMPLE 5

1,1′-Dihydroxy-cyclohexyl peroxide is prepared by proceeding as follows: 2.51 g of 69% strength hydrogen peroxide and 9.3 g of distilled water are introduced into a flask and 9.8 g of cyclohexanone are then added whilst keeping the temperature at 20°C. After the end of the addition, the reaction mixture is kept at 20°C for 2 hours. The peroxide precipitates as it is formed. It is filtered off, washed with water on the filter and then dried in vacuo. In this way, 10.4 g of a product which contains 6.75% by weight of active oxygen and which consists of 97% of 1,1′-dihydroxy-cyclohexyl peroxide (the pure peroxide has an active oxygen content of 6.95%) are obtained.

5.26 g of the product obtained above are added in portions to 58.25 g of a solution of ferrous octanoate in octanoic acid containing 0.5 g atom of iron/kg, under an atmosphere of nitrogen and with vigorous stirring, the temperature being kept at 20°C. After stirring for 30 minutes at this temperature, the reaction mixture is treated as in Example 1. The balance of the reaction is as follows:
cyclohexanone formed: 2.32 g,
dodecanedioic acid: 1.38 g,
2-n-butyl-octanedioic acid: 0.107 g and caproic acid: 0.6 g.

We claim:

1. In a process for the preparation of an alkane-dicarboxylic acid containing at least 8 carbon atoms in the linear divalent chain separating the hydroxycarbonyl groups, which comprises deperoxidising a peroxide obtainable by reacting hydrogen peroxide with a cycloalkanone of the general formula:

in which R represents a linear or branched divalent saturated hydrocarbon radical containing 4 to 7 carbon atoms in the linear part of R in the presence of an iron salt and a solvent, the improvement wherein the deperoxidization is carried out with a ferrous carboxylate in the presence of a first alkane-carboxylic acid containing at least 2 carbon atoms, as solvent.

2. Process according to claim 1, wherein a peroxide of the general formula:

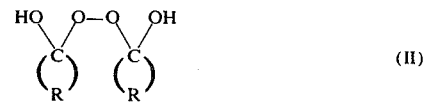

in which R is as hereinbefore defined is used, either alone or together with at least one peroxide of the general formula:

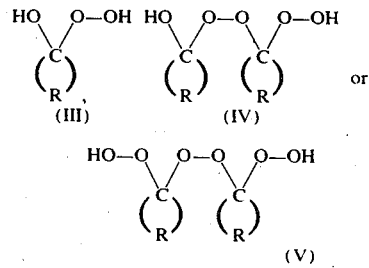

3. Process according to claim 1 wherein the linear part of R is substituted by 1 or 2 alkyl groups, which may be the same or different and each contain 1 to 4 carbon atoms.

4. Process according to claim 1, wherein the peroxide is 1,1′-dihydroxycyclopentyl peroxide, 1,1′-dihydroxycyclohexyl peroxide, 1,1′-dihydroxy-2,2′-dimethylcyclohexyl peroxide, 1,1′-dihydroxy-3,3′-dimethylcyclohexyl peroxide, 1,1′-dihydroxy-4,4′-dimethylcyclohexyl peroxide, 1,1'-dihydroxy-cycloheptyl peroxide or 1,1'-dihydroxy-cyclooctyl peroxide.

5. Process according to claim 1 wherein the peroxide is used in the form of a solution obtained by oxidation of the cycloalkanone with hydrogen peroxide in a second alkane-carboxylic acid containing at least 2 carbon atoms.

6. Process according to claim 5, wherein the second alkane-carboxylic acid has a higher boiling point than the cycloalkanone.

7. Process according to claim 5, wherein the second alkane-carboxylic acid is the same as the first alkane carboxylic acid used during the deperoxidation.

8. Process according to claim 1, wherein the first alkane-carboxylic acid has the same number of carbon atoms as the cycloalkanone of the formula (I).

9. Process according to claim 1, wherein the first alkane-carboxylic acid contains not more than 10% by weight of water.

10. Process according to claim 1, wherein the deperoxidation is carried out at a temperature of −100° to +100°C. and at a pressure which is greater than, less than or equal to atmospheric pressure.

11. Process according to claim 1, wherein the ferrous carboxylate is the salt of the first alkane-carboxylic acid.

12. Process according to claim 1, wherein the ferrous carboxylate is used in an amount such that the ratio of the number of ferrous ions to the number of active oxygen atoms is at least approximately 1:1.

13. Process according to claim 1, wherein the amount of first alkane-carboxylic acid is such that the greater part of the dicarboxylic acid is caused to precipitate as it is formed.

14. Process according to claim 1, wherein a solution of the peroxide and a solution of the ferrous carboxylate are mixed together and at least one of the peroxide solution and the ferrous carboxylate solution is saturated with the alkane-dicarboxylic acid which is being prepared.

15. Process according to claim 1, for the preparation of 1,12-dodecanedioic acid which comprises deperoxidising 1,1'-dihydroxy-cyclohexyl peroxide, either alone or together with at least one of 1-hydroperoxy-cyclohexanol, 1-hydroxy-1'-hydroperoxy-cyclohexyl peroxide and 1,1'-dihydroperoxy-cyclohexyl peroxide.

16. Process according to claim 15, wherein the ferrous carboxylate is ferrous pentanoate, caproate, heptanoate or octanoate and the alkane-carboxylic acid is pentanoic acid, caproic acid, heptanoic acid or octanoic acid.

17. Process according to claim 15, wherein the 1,1'-dihydroxycyclohexyl peroxide is used in the form of a crude solution obtained by oxidation of cyclohexanone with hydrogen peroxide in caproic acid.

\* \* \* \* \*